(12) United States Patent
Kang et al.

(10) Patent No.: US 11,030,832 B2
(45) Date of Patent: Jun. 8, 2021

(54) APPARATUS AND METHOD FOR GENERATING TEST CASE FOR VEHICLE

(71) Applicants: Hyundai Motor Company, Seoul (KR); Kia Motors Corporation, Seoul (KR)

(72) Inventors: Hyo Sup Kang, Seoul (KR); Choel Min Park, Incheon (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 267 days.

(21) Appl. No.: 16/410,727

(22) Filed: May 13, 2019

(65) Prior Publication Data
US 2020/0193738 A1 Jun. 18, 2020

(30) Foreign Application Priority Data
Dec. 12, 2018 (KR) .......................... 10-2018-0159721

(51) Int. Cl.
*G07C 5/08* (2006.01)
*B60R 16/023* (2006.01)
*G07C 5/00* (2006.01)

(52) U.S. Cl.
CPC .......... *G07C 5/085* (2013.01); *B60R 16/0232* (2013.01); *G07C 5/008* (2013.01)

(58) Field of Classification Search
CPC ...... G07C 5/085; G07C 5/008; B60R 16/0232
See application file for complete search history.

(56) References Cited

U.S. PATENT DOCUMENTS

| 4,692,921 A * | 9/1987 | Dahbura ........ G01R 31/318357 714/738 |
| 5,671,141 A * | 9/1997 | Smith ..................... F02D 41/22 701/1 |
| 2016/0295414 A1* | 10/2016 | Giraud ................... G07C 5/008 |

OTHER PUBLICATIONS

Welte; Using State Diagrams for Modeling Maintenance of Deteriorating Systems; IEEE Trans. on Power Systems, vol. 24, No. 1; Feb. 2009; pp. 58-66 (Year: 2009).*

* cited by examiner

*Primary Examiner* — Michael J Zanelli
(74) *Attorney, Agent, or Firm* — Slater Matsil, LLP

(57) ABSTRACT

An apparatus for generating a test case for a vehicle includes a communication device that receives vehicle data from an electronic device. The apparatus also includes a controller that converts the vehicle data to a state diagram, patterns the state diagram, and generates the test case based on the patterned state diagram.

22 Claims, 11 Drawing Sheets

| SYMBOL | DESCRIPTION |
|---|---|
| 31 — ● | ENTRY NODE |
| 32 — ⊙ | END NODE |
| 33 — HOME<br>34 — 44.0s | TYPE/HOLDING TIME |
| 35 — P_AccON ↓ | TRANSITION DIRECTION/<br>TRANSITION CONTENT |

FIG.3

APPARATUS AND METHOD FOR GENERATING TEST CASE FOR VEHICLE

CROSS-REFERENCE TO RELATED APPLICATIONS

This application claims priority to Korean Patent Application No. 10-2018-0159721, filed in the Korean Intellectual Property Office on Dec. 12, 2018, which application is hereby incorporated herein by reference.

TECHNICAL FIELD

The present disclosure relates to an apparatus and method for generating a test case for a vehicle.

BACKGROUND

In recent years, a technology for detecting defects present in a vehicle by collecting big data inside the vehicle and analyzing the collected big data has been required, and methods for detecting defects by generating a test case have been proposed accordingly.

In a case where big data is used without change to generate a test case, a large amount of time and cost is taken to generate the test case, and it is difficult to accurately understand test contents.

Accordingly, a technology for generating a generalized and patterned test case by processing big data is required.

SUMMARY

Embodiments described in the present disclosure can solve problems occurring in the prior art while advantages achieved by the prior art are maintained intact.

An aspect of the present disclosure provides an apparatus and method for generating a generalized and patterned test case for a vehicle by processing big data inside the vehicle.

Technical problems to be solved by the present disclosure are not limited to the aforementioned problems, and any other technical problems not mentioned herein will be clearly understood from the following description by those skilled in the art to which the present disclosure pertains.

According to an aspect of the present disclosure, an apparatus for generating a test case for a vehicle includes a communication device that receives vehicle data from an electronic device and a controller that converts the vehicle data to a state diagram, patterns the state diagram, and generates the test case based on the patterned state diagram.

The communication device may communicate with the electronic device via an in-vehicle network.

The communication device may communicate with the electronic device via V2X (vehicle-to-everything) communication.

The controller may classify the vehicle data according to electronic control units (ECUs) inside the vehicle, may filter the classified vehicle data to detect required vehicle data, and may convert the vehicle data to the state diagram, based on the required vehicle data.

The state diagram may include state information and transition information.

The state information may include types and holding time of the received vehicle data.

The transition information may include an input signal corresponding to an operation for a transition to different state information.

The controller, when determining that the state diagram overlaps with a pre-generated state diagram, may integrate the state information included in the state diagram with state information of the pre-generated state diagram.

The controller may generate the test case by extracting a test scenario based on the patterned state diagram and removing an overlapping test scenario.

The test scenario may include state information extracted in descending order of holding time, based on the patterned state diagram.

The test scenario may be extracted by assigning a priority in descending order of holding time, based on the patterned state diagram and excluding state information with a low priority.

According to another aspect of the present disclosure, a method for generating a test case for a vehicle includes receiving vehicle data from an electronic device, converting the vehicle data to a state diagram, patterning the state diagram, and generating the test case based on the patterned state diagram.

The vehicle data may be received from the electronic device via an in-vehicle network.

The vehicle data may be received from the electronic device via V2X communication.

The converting of the vehicle data to the state diagram may include classifying the vehicle data according to electronic control units (ECUs) inside the vehicle, detecting required vehicle data from the vehicle data classified according to the electronic control units (ECUs), and converting the vehicle data to the state diagram.

The state diagram may include state information and transition information.

The state information may include types and holding time of the received vehicle data.

The transition information may include an input signal corresponding to an operation for a transition to different state information.

The patterning of the state diagram may include integrating the state information included in the state diagram with state information of a pre-generated state diagram, when determining that the state diagram overlaps with the pre-generated state diagram.

The test case may be generated by extracting a test scenario based on the patterned state diagram and removing an overlapping test scenario.

The test scenario may include state information extracted in descending order of holding time, based on the patterned state diagram.

The test scenario may be extracted by assigning a priority in descending order of holding time, based on the patterned state diagram and excluding state information with a low priority.

BRIEF DESCRIPTION OF THE DRAWINGS

The above and other objects, features and advantages of the present disclosure will be more apparent from the following detailed description taken in conjunction with the accompanying drawings:

FIG. 3 is a view illustrating converted state diagram information according to an embodiment of the present disclosure;

DETAILED DESCRIPTION OF ILLUSTRATIVE EMBODIMENTS

Figure 1:
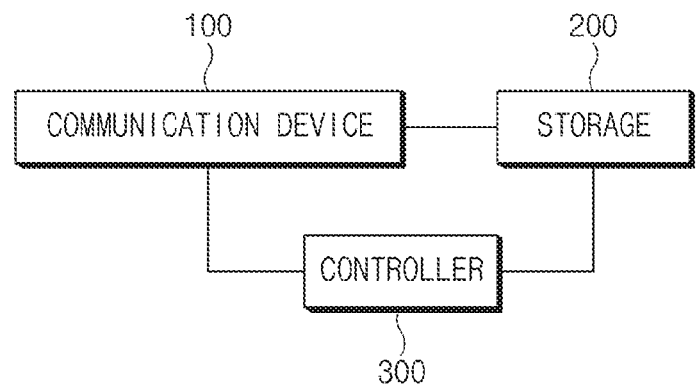
FIG. 1 is a block diagram illustrating an apparatus for generating a test case for a vehicle according to an embodiment.

Hereinafter, exemplary embodiments of the present disclosure will be described in detail with reference to the accompanying drawings. It should be understood that even if shown in different drawings, identical components are provided with identical reference numerals in the drawings. Furthermore, in describing the embodiments of the present disclosure, detailed descriptions related to well-known functions or configurations will be omitted when they may make subject matters of the present disclosure unnecessarily obscure.

Terms, such as "first", "second", "A", "B", "(a)", "(b)", and the like, may be used herein to describe components of the present disclosure. Such terms are only used to distinguish one component from another component, and the substance, sequence, order, or number of these components is not limited by these terms. Unless otherwise defined, all terms used herein, including technical and scientific terms, have the same meaning as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a block diagram illustrating an apparatus for generating a test case for a vehicle according to an embodiment.

As illustrated in FIG. 1, the apparatus for generating the test case for the vehicle according to the embodiment of the present disclosure may include a communication device 100, storage 200, and a controller 300.

The communication device 100 may receive vehicle data from any one of a first electronic device and a second electronic device.

The communication device 100 may communicate with the first electronic device via a in-vehicle network.

Here, the in-vehicle network may include a wired network such as a controller area network (CAN), a local interconnect network (LIN), or a media oriented system transport (MOST) network and may include a wireless network such as Bluetooth.

The first electronic device may include electronic devices of the vehicle that are capable of obtaining the vehicle data.

The communication device 100 may communicate with the second electronic device via V2X (vehicle-to-everything) communication.

Here, the V2X communication refers to a communication technology between the vehicle and all interfaces. Specifically, the V2X communication may include vehicle-to-nomadic devices (V2N) communication, vehicle-to-vehicle (V2V) communication, and vehicle-to-infrastructure (V2I) communication.

The V2X communication may be performed via at least one of short range communication, wired communication, and wireless communication.

The short range communication may transmit and receive signals in a close range by using a wireless communication network such as Bluetooth, infrared communication, radio frequency identification (RFID) communication, wireless local access network (WLAN) communication, near field communication (NFC), or Zigbee.

The wired communication may be performed using universal serial bus (USB). That is, the V2X communication may be performed via direct connection between the vehicle and a nomadic device.

The wireless communication may be performed through various wireless communication schemes such as global system for mobile communication (GSM), code division multiple access (CDMA), wideband code division multiple access (WCDMA), universal mobile telecommunications system (UMTS), time division multiple access (TDMA), and long term evolution (LTE), in addition to a Wi-Fi module and a wireless broadband (WiBro) module.

The second electronic device refers to an electronic device that is capable of performing V2X communication with the vehicle. The second electronic device may include a vehicle, an infrastructure, or a portable terminal.

The vehicle data may include signal information and temporal information that are transmitted and received between the communication device 100 and any one of the first electronic device and the second electronic device. According to an embodiment, the vehicle data may include a function that is activated in response to a user input. For example, the signal information may include a function that is activated by operating an audio, video, and navigation (AVN) of the vehicle, and may include receiving radio, making a phone call, playing music, watching DMB, and searching a map. The temporal information may include time spent receiving the radio, time spent making the phone call, time spent playing the music, time spent watching the DMB, and time spent searching the map.

The storage 200 may store the vehicle data and patterned data. At this time, the storage 200 may store the data in minimum processing units.

The storage 200 may include at least one storage medium among flash memory, a hard disc, a memory card, read-only memory (ROM), random access memory (RAM), electrically erasable programmable read-only memory (EEPROM), programmable read-only memory (PROM), magnetic memory, a magnetic disc, and an optical disc.

The controller 300 may control an overall operation of the apparatus for generating the test case for the vehicle according to the embodiment of the present disclosure.

According to an embodiment of the present disclosure, the controller 300 may convert the vehicle data to a state diagram, pattern the converted state diagram, and generate a test case based on the patterned state diagram. A more specific description thereabout will be given with reference to FIG. 2.

Figure 2:
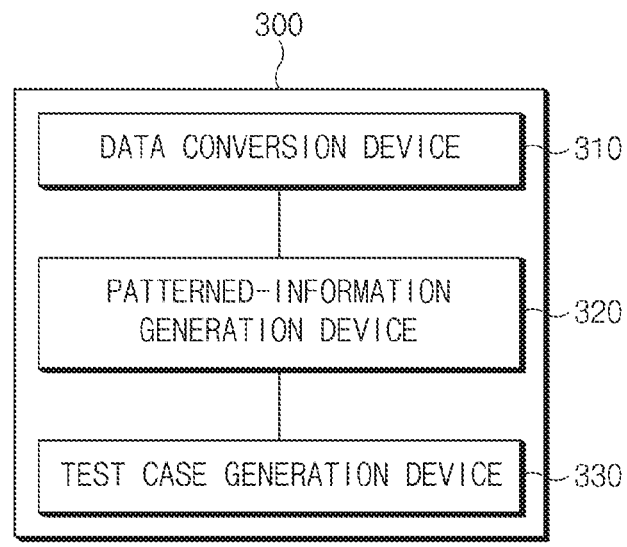
FIG. 2 is a block diagram illustrating a controller of the test case generating apparatus according to an embodiment of the present disclosure.

FIG. 2 is a block diagram illustrating the controller of the test case generating apparatus according to an embodiment of the present disclosure.

As illustrated in FIG. 2, the controller 300 of the test case generating apparatus according to the embodiment of the present disclosure may include a data conversion device 310, a patterned-information generation device 320, and a test case generation device 330.

The data conversion device 310 may receive vehicle data in real time from any one of the first electronic device and the second electronic device, or may receive vehicle data stored in the storage 200.

The data conversion device 310 may classify the received vehicle data according to electronic control units (ECUs) inside the vehicle.

The data conversion device 310 may filter the classified vehicle data and may determine whether the vehicle data corresponds to required vehicle data. The data conversion device 310 may determine that vehicle data having temporal information exceeding reference time corresponds to the required vehicle data.

When determining that the vehicle data does not correspond to the required vehicle data, the data conversion device 310 may receive vehicle data again.

Accordingly, the data conversion device 310 may reduce a task of computing unnecessary vehicle data rather than the required vehicle data by filtering the vehicle data and therefore may effectively process the vehicle data.

Meanwhile, when determining that the received vehicle data corresponds to the required vehicle data, the data conversion device 310 converts the vehicle data to a state diagram.

More specifically, the data conversion device 310 may generate a state diagram including state information and transition information by converting the vehicle data.

The state information may include the types and the holding time of the vehicle data received from when the ignition of the vehicle is turned on to when the ignition of the vehicle is turned off.

For example, in a case where a function activated by a user is radio and time spent listening to the radio is 10 minutes, the data conversion device 310 may generate state information that the vehicle data type is radio and the holding time is 10 minutes.

The transition information may include an input signal corresponding to an operation for a transition to different state information from when the ignition of the vehicle is turned on to when the ignition of the vehicle is turned off.

For example, the transition information may include an input signal T corresponding to a touch key operation, an input signal H corresponding to a hard key operation, an input signal P corresponding to a physical operation of the user, and an input signal COM corresponding to a combination of a touch operation and a hard operation.

Here, the touch key operation may include an operation of touching the AVN screen, the hard key operation may include an operation of pressing a button attached to the inside the vehicle, and the physical operation may include an operation of turning on the ignition of the vehicle or shifting gears to P, N, D, or R.

A detailed description of the state diagram information generated by the data conversion device 310 from when the ignition of the vehicle is turned on to when the ignition of the vehicle is turned off will be given with reference to FIGS. 3 and 4.

FIG. 3 is a view illustrating converted state diagram information according to an embodiment of the present disclosure.

As illustrated in FIG. 3, the data conversion device 310 may generate an entry node 31 and an end node 32 and may generate state information that includes a vehicle data type 33 and holding time 34.

For example, when a function activated by the user is a HOME screen and the time during which the HOME screen is maintained is 44 seconds, the data conversion device 310 may generate state information by setting the vehicle data type 33 to HOME and the holding time 34 to 44 seconds.

The data conversion device 310 may generate transition information 35 that includes an arrow indicating a direction in which the state information transitions to different state information and an input signal type, and may generate information P-AccOn that the ignition of the vehicle has been turned on by the user's physical operation, as the transition information.

Figure 4:
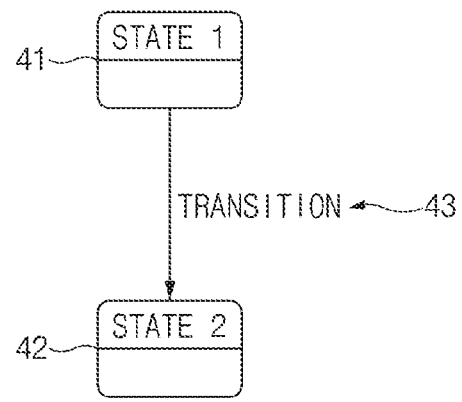
FIG. 4 is a view illustrating a basic structure of a state diagram according to an embodiment of the present disclosure.

FIG. 4 is a view illustrating a basic structure of a state diagram according to an embodiment of the present disclosure.

As illustrated in FIG. 4, the data conversion device 310 may generate different state information 41 and 42 and transition information 43 for the transition from the state information 41 to the state information 42, as the basic structure of the state diagram.

For example, the data conversion device 310 may generate state information as listed in Table 1 below in a case where after the ignition of the vehicle is turned on, a user plays music for 10 minutes through a USB, makes a telephone call for 5 minutes using a portable terminal connected to the vehicle via Bluetooth, plays music again for 20 minutes through the USB, listens to FM radio for 10 minutes, and plays music again for 20 minutes through the USB, and thereafter the ignition of the vehicle is turned off.

TABLE 1

| | State Information | |
|---|---|---|
| | Vehicle Data Type | Holding Time |
| 1 | Playing Music through USB | 10 minutes |
| 2 | Bluetooth Call | 5 minutes |
| 3 | Playing Music through USB | 20 minutes |
| 4 | Receiving FM radio | 10 minutes |
| 5 | Playing Music through USB | 20 minutes |

Referring again to FIG. 2, after generating the state information and the transition information by converting the vehicle data as described above, the data conversion device 310 receives vehicle data again when vehicle data to be additionally converted is present, and transmits the state diagram to the patterned-information generation device 320 when vehicle data to be additionally converted is not present.

The patterned-information generation device 320, when receiving the state diagram, determines whether the state diagram overlaps with a pre-generated state diagram. Here, the pre-generated state diagram may refer to a state diagram generated first by the data conversion device 310.

When determining that the state diagram does not overlap with the pre-generated state diagram, the patterned-information generation device 320 adds the state information and the transition information included in the state diagram received from the data conversion device 310 to the pre-generated state diagram.

When determining that the state diagram overlaps with the pre-generated state diagram, the patterned-information generation device 320 integrates the state information included in the state diagram received from the data conversion device 310 with state information of the pre-generated state diagram.

Here, integrating the state information of the state diagram received from the data conversion device 310 with the state information of the pre-generated state diagram may refer to adding up the holding time of the two pieces of state information.

For example, the patterned-information generation device 320 may add up the holding time of the three pieces of overlapping state information in Table 1 that are associated with playing music through USB, thereby integrating the three pieces of overlapping state information into one piece of state information.

Accordingly, as listed in Table 2 below, the patterned-information generation device 320 may pattern the state diagram by generating state information that the vehicle data type is Playing music through USB and the holding time is 50 minutes, state information that the vehicle data type is Bluetooth call and the holding time is 5 minutes, and state information that the vehicle date type is Receiving FM radio and the holding time is 10 minutes.

TABLE 2

State Information

| | Vehicle Data Type | Holding Time |
|---|---|---|
| 1 | Playing Music through USB | 50 minutes |
| 2 | Bluetooth Call | 5 minutes |
| 3 | Receiving FM radio | 10 minutes |

For example, the patterned state diagram will be described with reference to FIG. 5.

Figure 5:
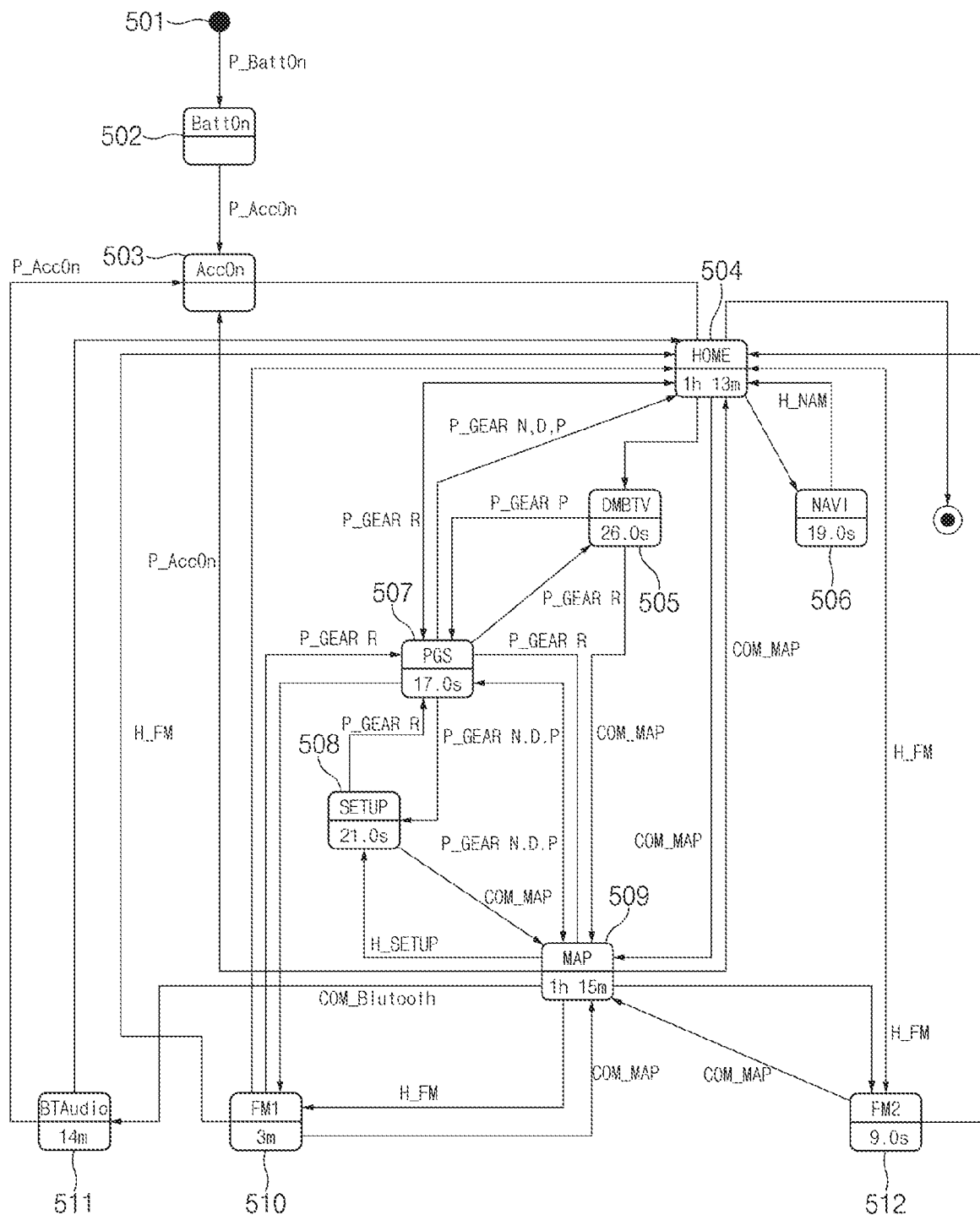
FIG. 5 is a patterned state diagram according to an embodiment of the present disclosure.

FIG. 5 is a patterned state diagram according to an embodiment of the present disclosure.

As illustrated in FIG. 5, the patterned state diagram may include an entry node 501, state information 502 to 512, transition information including input signals corresponding to operations for transitions between different state information, and an end node 513.

For example, the patterned state diagram of FIG. 5 may include the state information 509 to which the state information 504, 505, 508, 510, and 512 transition, and may include the transition information that transitions to MAP are performed by COM_MAP, that is, a combination of a touch key operation and a hard key operation when the state information 504, 505, 508, 510, and 512 transition to the state information 509.

The state information 509 may include a vehicle data type including an MAP function activated by the user and a holding time of an hour and 15 minutes that is equal to the sum of time spent using the activated MAP function.

The test case generation device 330 may generate a test case based on the patterned data from the patterned-information generation device 320.

The test case generation device 330 may generate the test case by extracting a test scenario from the patterned state diagram and removing an overlapping scenario from the extracted scenario.

The reason why the test case generation device 330 extracts the test scenario is because a test objective may be unclear and the test case may be complex when the test case is generated using the entire patterned data.

According to an embodiment, the test case generation device 330 may extract the test scenario from the patterned data in descending order of holding time or in descending order of the number of times that state information is duplicated.

For example, the test case generation device 330 may select the state information 509, 510, and 511 from the state diagram of FIG. 5 in descending order of holding time and may extract the state information 509, 510, and 511 as the test scenario. A more specific description thereabout will be given with reference to FIG. 6.

Figure 6:
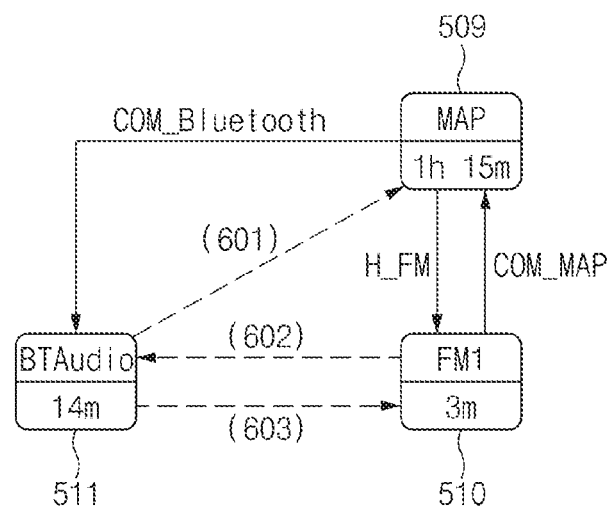
FIG. 6 is a view illustrating an extracted test scenario according to an embodiment of the present disclosure.

FIG. 6 is a view illustrating an extracted test scenario according to an embodiment of the present disclosure.

As illustrated in FIG. 6, the test case generation device 330 may extract the state information 509, 510, and 511 and transition information as a test scenario.

In a case where the vehicle data received by the data conversion device 310 does not include transition information, the transition information for the transition from the state information 511 to the state information 509 is not included as illustrated in FIG. 6.

However, since the test case generation device 330 extracts the test scenario in descending order of holding time, the state information extracted as the test scenario may be determined to be functions frequently used by the user, and therefore the transition information may be additionally generated although not included in the vehicle data received by the data conversion device 310.

For example, the test case generation device 330 may additionally generate transition information 601 by which the state information 511 transitions to the state information 509, transition information 603 by which the state information 511 transitions to the state information 510, and transition information 602 by which the state information 510 transitions to the state information 511.

According to another embodiment, the test case generation device 330 may extract a test scenario by excluding state information with a holding time of less than a predetermined period of time.

For example, the test case generation device 330 may extract the remaining state information other than the state information 506, 507, 508, and 512, which has a holding time of less than the predetermined period of time, from the state diagram of FIG. 5 as a test scenario. A more specific description thereabout will be given with reference to FIG. 7.

Figure 7:
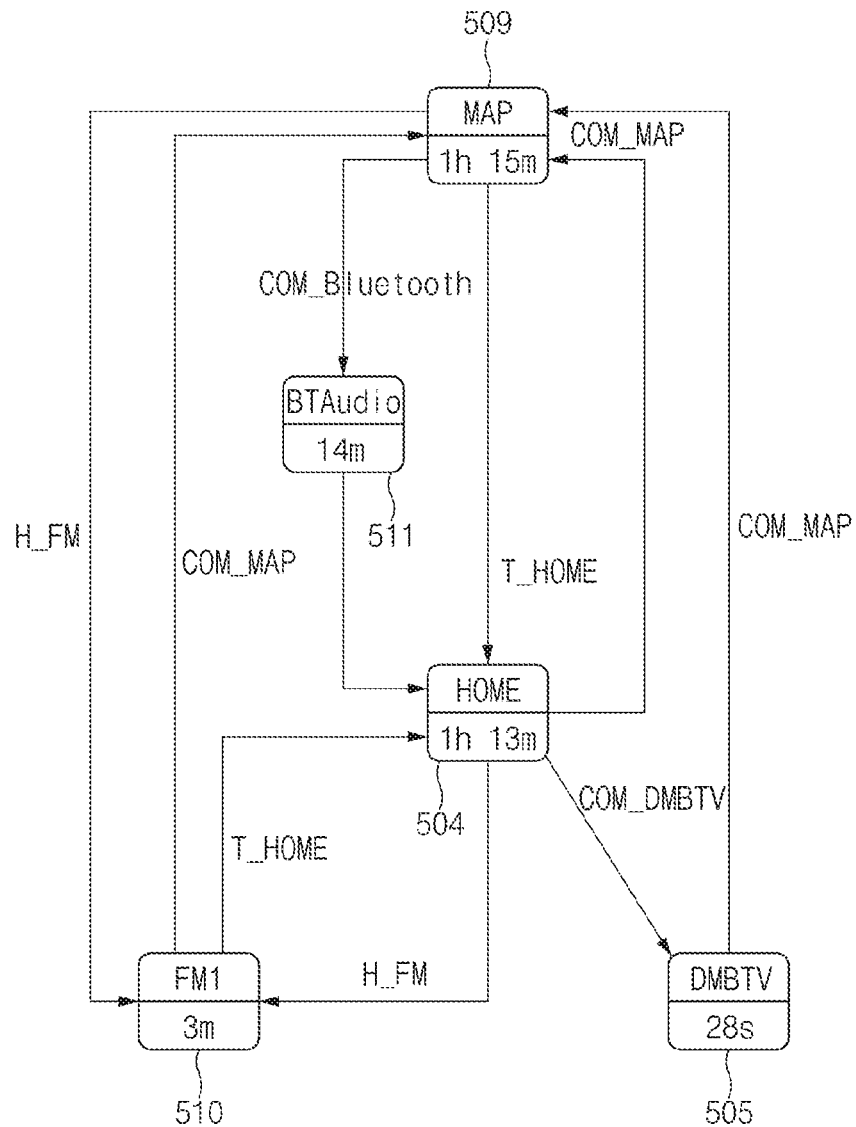
FIG. 7 is a view illustrating an extracted test scenario according to another embodiment of the present disclosure.

FIG. 7 is a view illustrating an extracted test scenario according to another embodiment of the present disclosure.

As illustrated in FIG. 7, the test case generation device 330 may extract the state information 504, 505, 509, 510, and 511 and transition information as a test scenario.

When the extracted test scenario is duplicated, the test case generation device 330 may remove the extracted test scenario.

The test case generation device 330 may generate a test case based on the test scenario from which an overlapping test scenario is removed.

The test case generation device 330 may set a condition for entrance to an initial state for performing the test scenario, operate based on the state information and the transition information included in the test scenario, and set a standard required during the operation or a performance standard, thereby generating the test case.

The test case generation device 330 may facilitate detection of defects caused by functions that the user frequently uses, by generating the test case as described above.

Figure 8:
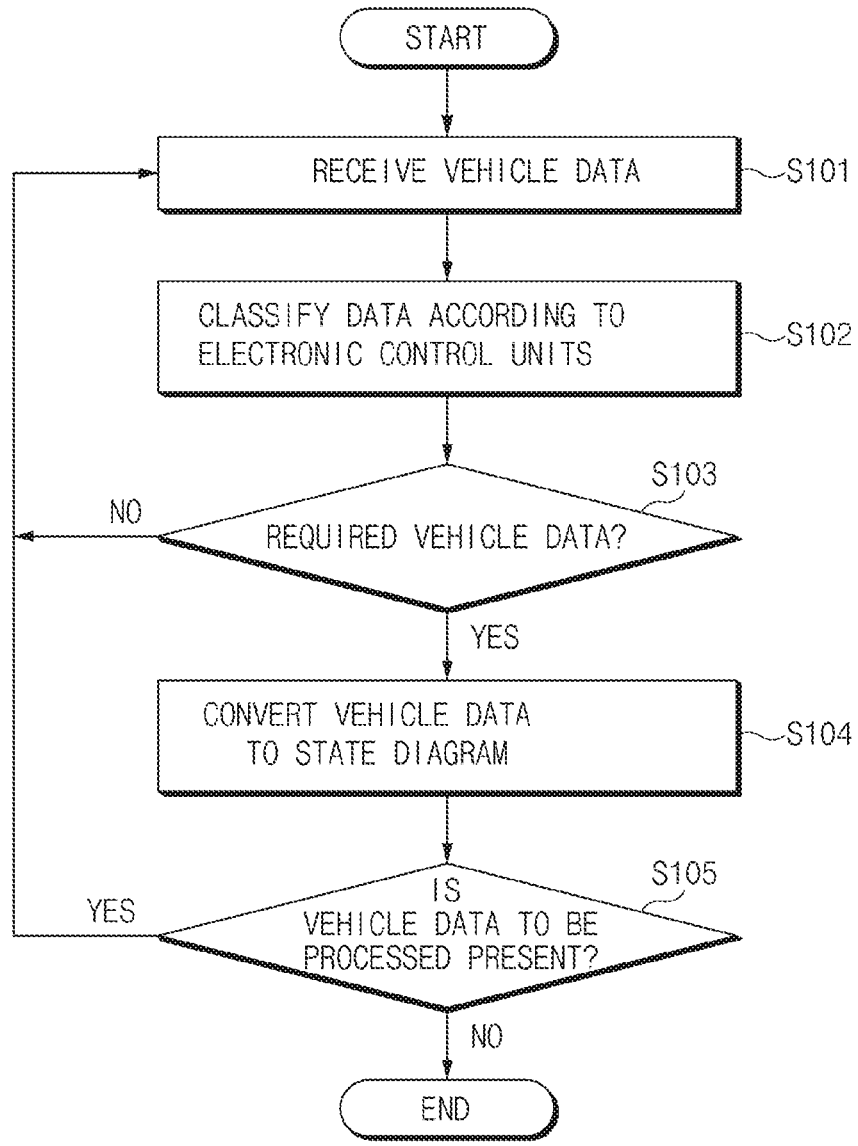
FIG. 8 is a flowchart illustrating a method for converting data according to an embodiment of the present disclosure.

FIG. 8 is a flowchart illustrating a method for converting data according to an embodiment of the present disclosure.

As illustrated in FIG. 8, the data conversion device 310 receives vehicle data in real time from any one of the first electronic device and the second electronic device (Step S101).

The data conversion device 310 classifies the received vehicle data according to the electronic control units (ECUs) inside the vehicle (Step S102).

The data conversion device 310 filters the classified vehicle data and determines whether the vehicle data corresponds to required vehicle data (Step S103). In step S103, the data conversion device 310 may determine that vehicle data having temporal information exceeding reference time corresponds to the required vehicle data.

When the determination result in step S103 shows that the received vehicle data does not correspond to the required vehicle data (NO), the data conversion device 310 performs step S101.

When the determination result in step S103 shows that the received vehicle data corresponds to the required vehicle data (YES), the data conversion device 310 converts the vehicle data to a state diagram that includes state information and transition information (Step S104).

In step S104, the data conversion device 310 may generate the state information that includes the types and the holding time of the vehicle data received from when the ignition of the vehicle is turned on to when the ignition of the vehicle is turned off.

After the conversion to the state information and the transition information, the data conversion device 310 determines whether vehicle data to be additionally converted is present (Step S105).

When the determination result in step S105 shows that vehicle data to be additionally converted is present (YES), the data conversion device 310 performs step S101.

When the determination result in step S105 shows that vehicle data to be additionally converted is not present (NO), the data conversion device 310 ends the process.

Figure 9:
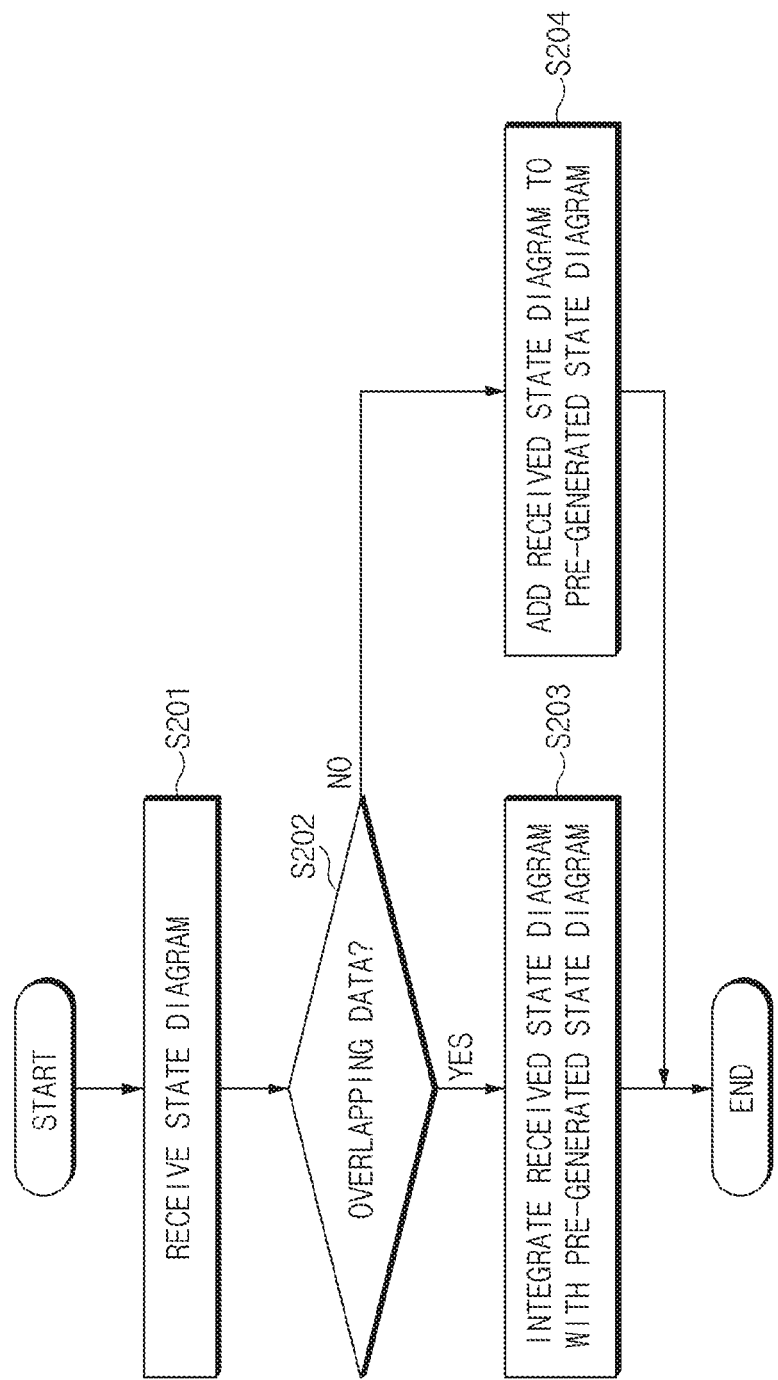
FIG. 9 is a flowchart illustrating a method for patterning a state diagram according to an embodiment of the present disclosure.

FIG. 9 is a flowchart illustrating a method for patterning a state diagram according to an embodiment of the present disclosure.

As illustrated in FIG. 9, the patterned-information generation device 320 may perform steps S201 to S204 to pattern a state diagram generated by the data conversion device 310.

The patterned-information generation device 320 receives the state diagram from the data conversion device 310 (Step S201).

The patterned-information generation device 320 determines whether the received state diagram overlaps with a pre-generated state diagram (Step S202). Here, the pre-generated state diagram may refer to a state diagram generated first by the data conversion device 310.

When the determination result in step S202 shows that the received state diagram overlaps with the pre-generated state diagram (YES), the patterned-information generation device 320 integrates state information included in the state diagram received from the data conversion device 310 with state information of the pre-generated state diagram (Step S203).

When the determination result in step S202 shows that the received state diagram does not overlap with the pre-generated state diagram (NO), the patterned-information generation device 320 adds the state information and the transition information included in the state diagram received from the data conversion device 310 to the pre-generated state diagram (Step S204).

Figure 10:
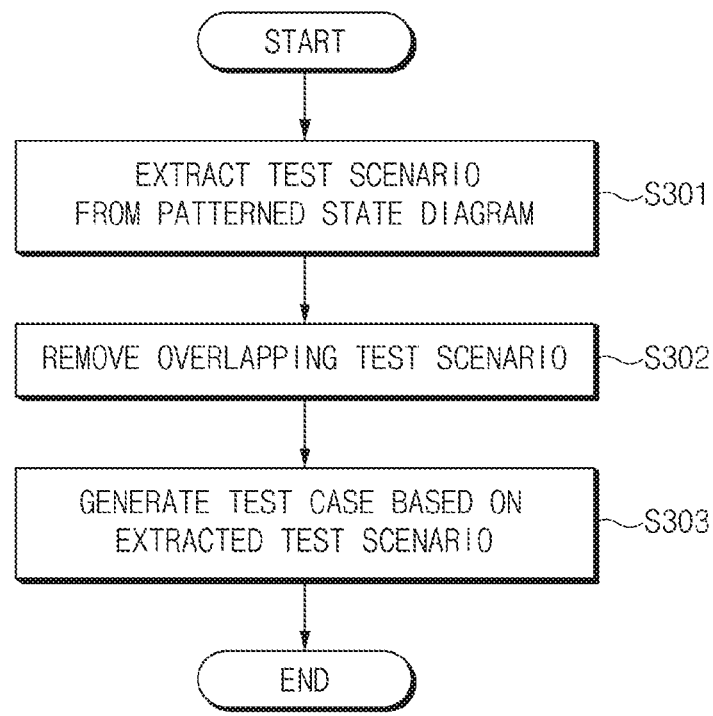
FIG. 10 is a flowchart illustrating a method for generating a test case according to an embodiment of the present disclosure.

FIG. 10 is a flowchart illustrating a method for generating a test case according to an embodiment of the present disclosure.

As illustrated in FIG. 10, the test case generation device 330 extracts a test scenario from information patterned by the patterned-information generation device 320 (Step S301).

According to an embodiment, in step S301, the test case generation device 330 may extract the test scenario from the patterned data in descending order of holding time or in descending order of the number of times that state information is duplicated.

According to another embodiment, in step S301, the test case generation device 330 may extract the test scenario by excluding state information with a holding time of less than a predetermined period of time.

The test case generation device 330 determines whether the extracted test scenario is duplicated, and removes an overlapping test scenario (Step S302).

The test case generation device 330 generates a test case based on the test scenario from which the overlapping test scenario is removed (Step S303).

Figure 11:
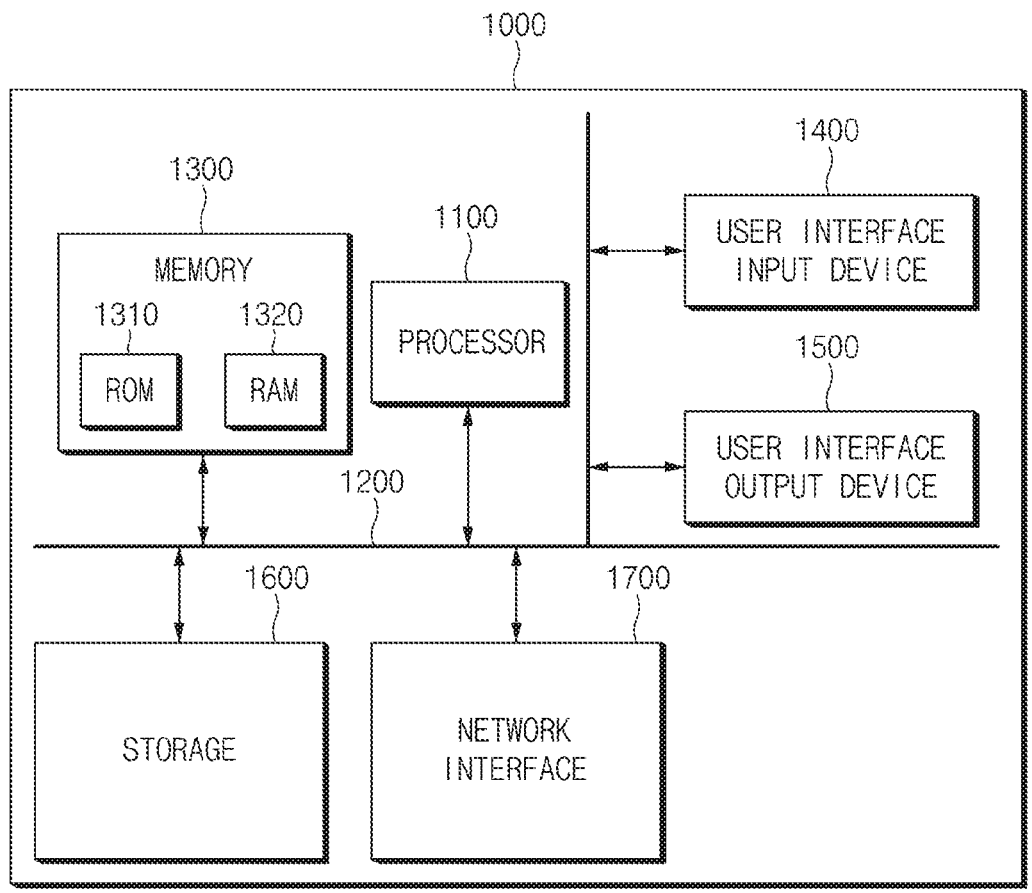
FIG. 11 is a view illustrating a configuration of a computing system for executing a method according to an embodiment of the present disclosure.

FIG. 11 is a view illustrating a configuration of a computing system for executing a method according to an embodiment of the present disclosure.

Referring to FIG. 11, the computing system 1000 may include at least one processor 1100, memory 1300, a user interface input device 1400, a user interface output device 1500, storage 1600, and a network interface 170o that are coupled together through a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage mediums. For example, the memory 1300 may include read only memory (ROM) 1310 and random access memory (RAM) 1320.

Accordingly, the steps of the methods or algorithms described in relation to the embodiments disclosed herein may be directly implemented with a hardware module or a software module executed by the processor 1100, or a combination thereof. The software module may reside in a storage medium (that is, the memory 1300 and/or the storage 1600) such as RAM memory, flash memory, ROM memory, EPROM memory, EEPROM memory, a register, a hard disk, a detachable disk, or CD-ROM. The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside in a user terminal. In another case, the processor 1100 and the storage medium may reside in the user terminal as separate components.

According to the embodiments of the present disclosure, the apparatus and method for generating a test case for a vehicle may prevent potential accidents inside the vehicle and may reduce traffic accidents by inducing driver safety.

Furthermore, the apparatus and method may accurately detect defects by generating a test case based on real-time vehicle sensor information and driving information.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. An apparatus for generating a test case for a vehicle, the apparatus comprising:
   a communication device configured to receive vehicle data from an electronic device; and
   a controller configured to convert the vehicle data to a state diagram, to pattern the state diagram, and to generate the test case based on the patterned state diagram.

2. The apparatus of claim 1, wherein the communication device is capable of communication with the electronic device via an in-vehicle network.

3. The apparatus of claim 1, wherein the communication device is capable of communication with the electronic device via V2X communication.

4. The apparatus of claim 1, wherein the controller is configured to classify the vehicle data according to electronic control units (ECUs) inside the vehicle, to filter the classified vehicle data to detect required vehicle data, and to convert the vehicle data to the state diagram based on the required vehicle data.

5. The apparatus of claim 1, wherein the state diagram includes state information and transition information.

6. The apparatus of claim 5, wherein the transition information includes an input signal corresponding to an operation for a transition to different state information.

7. The apparatus of claim 5, wherein the state information includes types and holding time of the received vehicle data.

8. The apparatus of claim 7, wherein the controller is configured to integrate the state information included in the state diagram with state information of a pre-generated state diagram when determining that the state diagram overlaps with the pre-generated state diagram.

9. The apparatus of claim 8, wherein the controller is configured to generate the test case by extracting a test scenario based on the patterned state diagram and removing an overlapping test scenario.

10. The apparatus of claim 9, wherein the test scenario includes state information extracted in descending order of holding time, based on the patterned state diagram.

11. The apparatus of claim 9, wherein the test scenario is extracted by assigning a priority in descending order of holding time, based on the patterned state diagram and excluding state information with a low priority.

12. A method for generating a test case for a vehicle, the method comprising:
   receiving vehicle data from an electronic device;
   converting the vehicle data to a state diagram;
   patterning the state diagram; and
   generating the test case based on the patterned state diagram.

13. The method of claim 12, wherein the vehicle data is received from the electronic device via an in-vehicle network.

14. The method of claim 12, wherein the vehicle data is received from the electronic device via V2X communication.

15. The method of claim 12, wherein converting the vehicle data to the state diagram comprises:
   classifying the vehicle data according to electronic control units (ECUs) inside the vehicle; and
   detecting required vehicle data from the vehicle data classified according to the electronic control units (ECUs) and converting the vehicle data to the state diagram.

16. The method of claim 15, wherein the state diagram includes state information and transition information.

17. The method of claim 16, wherein the transition information includes an input signal corresponding to an operation for a transition to different state information.

18. The method of claim 16, wherein the state information includes types and holding time of the received vehicle data.

19. The method of claim 18, wherein the patterning of the state diagram comprises integrating the state information included in the state diagram with state information of a pre-generated state diagram, when determining that the state diagram overlaps with the pre-generated state diagram.

20. The method of claim 19, wherein the test case is generated by extracting a test scenario based on the patterned state diagram and removing an overlapping test scenario.

21. The method of claim 20, wherein the test scenario includes state information extracted in descending order of holding time, based on the patterned state diagram.

22. The method of claim 20, wherein the test scenario is extracted by assigning a priority in descending order of holding time, based on the patterned state diagram and excluding state information with a low priority.

* * * * *